US008028141B2

(12) United States Patent
Bakke et al.

(10) Patent No.: US 8,028,141 B2
(45) Date of Patent: Sep. 27, 2011

(54) PARTITIONING OF A MULTIPLE LOGIC-UNIT-NUMBER SCSI TARGET

(75) Inventors: Brian Eric Bakke, Rochester, MN (US); Ellen Marie Bauman, Rochester, MN (US); Timothy Jerry Schimke, Stewartville, MN (US); Lee Anton Sendelbach, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 656 days.

(21) Appl. No.: 12/132,048

(22) Filed: Jun. 3, 2008

(65) Prior Publication Data

US 2009/0300308 A1    Dec. 3, 2009

(51) Int. Cl.
  *G06F 13/10* (2006.01)
(52) U.S. Cl. ......................................... 711/163
(58) Field of Classification Search .................. None
  See application file for complete search history.

(56) References Cited

U.S. PATENT DOCUMENTS

| 5,471,634 | A  | * | 11/1995 | Giorgio et al. ...................... 1/1 |
| 7,844,444 | B1 | * | 11/2010 | Asbridge et al. ................ 703/23 |
| 2003/0212883 | A1 | * | 11/2003 | Lee et al. .......................... 713/1 |
| 2005/0204366 | A1 | * | 9/2005 | Billau et al. ................... 719/324 |
| 2005/0240932 | A1 | * | 10/2005 | Billau et al. .................. 718/104 |

* cited by examiner

*Primary Examiner* — Duc Doan
(74) *Attorney, Agent, or Firm* — Rabin & Berdo, PC

(57) ABSTRACT

A method, computer program product and computer system for assigning logic storage entities of a storage device to multiple partitions of a computer system, which includes associating each logic storage entity to one of the partitions that are allowed to access the logic storage entity; configuring a partition supervisor to control accesses of the partitions to the logic storage entities, so that the partitions can share resources when accessing the logic storage entities; and providing an interceptor in the partition supervisor, so that a request or a response between a select logic storage entity and a select partition is intercepted if the select partition is not allowed to access the select storage entity.

21 Claims, 6 Drawing Sheets

PARTITIONING OF A MULTIPLE LOGIC-UNIT-NUMBER SCSI TARGET

BACKGROUND

1. Technical Field

The present invention relates to storage management. More specifically, it relates to assigning logic storage entities of a storage device to multiple partitions of a computer system, so that the partitions only access the logic storage entities that they are allowed to access, and can share resources when accessing the logic storage entities.

2. Background Information

Large computer systems are usually partitioned into a number of logical partitions. Each logical partition represents a division of resources in the system, and operates as an independent logical system. An example of logical partitions is the partitioning of a multiprocessor computer system into multiple independent servers, each with it own processors, main storage, and I/O devices.

A typical resource that each logical partition requires is disk storage. Many systems utilize devices supporting the Small Computer System Interface (SCSI) standards, which define commands, protocols, and electrical and optical interfaces for storage devices. Most storage devices use the SCSI Upper Level Protocol (ULP) to control the devices.

The relationship between SCSI devices is encapsulated by a client-server service-delivery model. The client is called an SCSI initiator and the server is called an SCSI target. An SCSI domain consists of a least one SCSI device, at least one SCSI target and at least one SCSI initiator interconnected by a service delivery subsystem. An SCSI target consists of one or more SCSI logical storage entities, e.g. logic units each with a logic unit number (LUN). For partitions accessing storage devices, a partition is an SCSI initiator, and a storage device is an SCSI target. A storage device (or target) may contain a single LUN, for example, when a small hard disk is used as the storage device. Or, a storage device may contain multiple LUNs, for instance, when the storage device includes external RAID boxes. Each partition must have accesses to all LUNs assigned to that partition, but should not access any LUN that is not assigned to that partition.

A Multiple LUN (Multi-LUN) SCSI target is a target that contains multiple LUNs. A large computer system may contain one or more Multi-LUN SCSI targets, and different LUNs of each multiple LUN SCSI target may be assigned to different partitions. When the SCSI ULP allows an initiator (i.e. a partition) to send commands to a target, all the LUNs contained within the target will be exposed to the initiator. Hence, one partition may see LUNs assigned to other partitions.

To prevent one partition from accessing LUNs assigned to other partitions, all LUNs contained in a target can be assigned to a single partition. However, large storage devices, such as an external RAID storage box, could not be shared between multiple partitions, thus resulting in a waste of resources. Alternatively, a proxy server partition (e.g. a virtual I/O server) can be used to help communicate between partitions and LUNs. The proxy server partition would own all of the LUNs and server portions of those LUNs to other partitions. However, since commands and data would have to be routed through a third party partition (i.e. the proxy server partition), there would be a significant amount of additional processing overhead and data transfer overhead.

SUMMARY

A method, computer program product and computer system for assigning logic storage entities of a storage device to multiple partitions of a computer system, which includes associating each logic storage entity to one of the partitions that are allowed to access the logic storage entity; configuring a partition supervisor to control accesses of the partitions to the logic storage entities, so that the partitions can share resources when accessing the logic storage entities; and providing an interceptor in the partition supervisor, so that a request or a response between a select logic storage entity and a select partition is intercepted if the select partition is not allowed to access the select storage entity.

DETAILED DESCRIPTION

Figure 1:
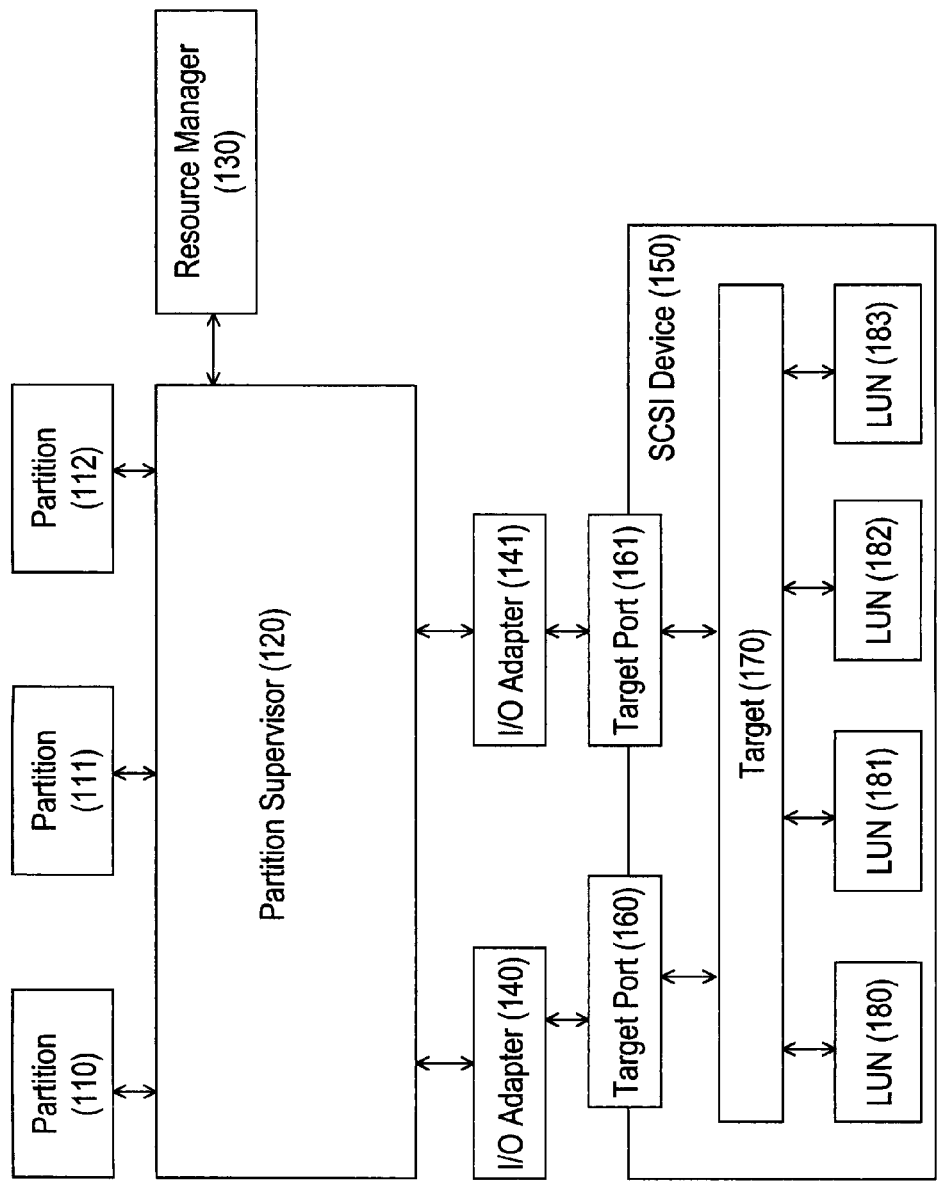
FIG. 1 is a conceptual diagram illustrating multiple partitions sharing a Multi-LUN SCSI target.

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable media may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention is related to a method that enables multiple partitions to share a Multi-LUN SCSI target. Partitions can send commands directly to the SCSI LUNs that they own in the SCSI target. Since no proxy server partition is needed for a partition to access its LUN, unnecessary overhead is reduced. In the present invention, partitions can use full SCSI ULP to control the target device. Partitions share the common physical paths (e.g. PCI bus, I/O Adapter, Device Bus) to the SCSI target. No path is dedicated to a single partition. Since each partition can only see and access the LUNs that it owns, no partition-to-partition communication for coordination is needed.

FIG. 1 is a conceptual diagram illustrating that multiple partitions share a multi-LUN SCSI target. Target 170 is an SCSI storage device with four logic units: LUN 180, LUN 181, LUN 182 and LUN 183. The four LUNs are assigned to three different partitions: partition 110, partition 111, and partition 112. For the purpose of describing the present invention, as an example, LUN 180 is assigned to partition 110, LUN 181 and LUN 183 are assigned to partition 111, and LUN 182 is assigned to partition 112. Other possible LUN assignments to partitions could also be made as would be obvious to someone skilled in the art. Target 170 has two I/O ports: target port 160 and target port 161, which are connected to SCSI resources, i.e. I/O adapters. Two I/O adapters, I/O adapter 140 and I/O adapter 141, are shown in this example. The three partition access the LUNs via the I/O adaptors and target ports. Other configurations of a multi-LUN SCSI target containing any number of LUNs, one or more target ports and one or more I/O adapters could also be contemplated as would by someone skilled in the art. In an alternate embodiment, an I/O adapter could also be connected to one or more target ports.

A partition supervisor 120 connects the partitions (e.g. partitions 110-112 in FIG. 1) to the SCSI resources (e.g. I/O adapters). The partition supervisor assigns physical resources to virtual partitions. A resource manager 130 manages data storage resources. The functions of the resource manager 130 may include data storage, data collection, data backup, data recovery, storage virtualization, storage provisioning, user authentication, SAN performance analysis, forecasting of future needs and management of network expansion.

Figure 2:
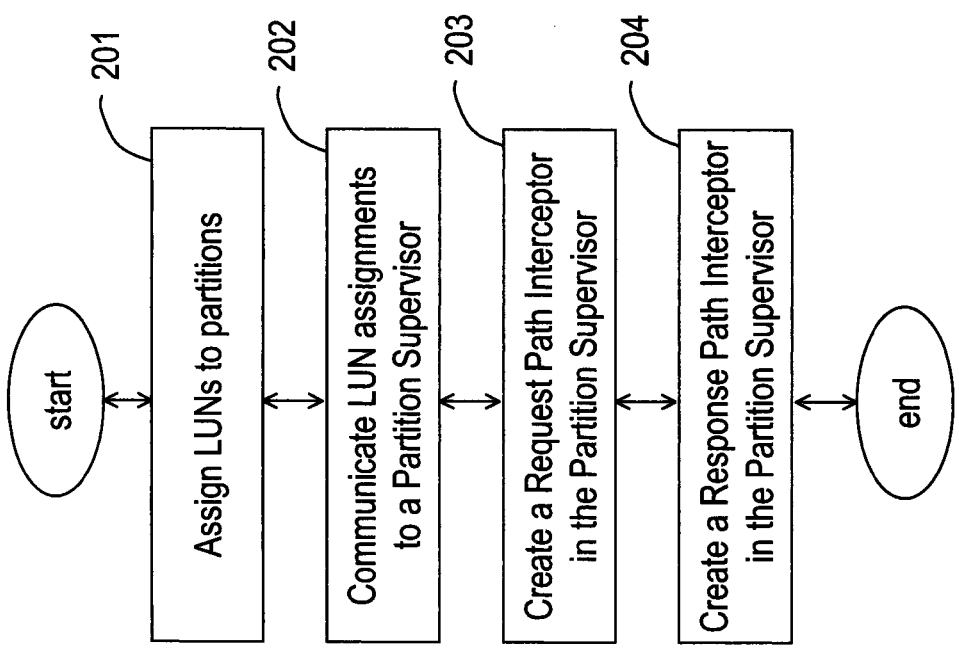
FIG. 2 is a flowchart showing the steps in which a preferred embodiment of the present invention can be implemented.

FIG. 2 is a flowchart showing the steps in which a preferred embodiment of the present invention can be implemented. In state 201, LUNs are assigned to partitions. The resource manager 130 discovers all of the LUNs attached to the system. The discovery method is specific to the protocol (i.e. Peripheral Component Interconnect (PCI), serial-attached SCSI (SAS), and Fibre Channel) that the storage system uses. For example, if the system uses SAS, the LUNs are discovered by sending a SCSI Report LUNs command to either a LUN 0 or a Well Known LUN attached to each Target Port-Target pair (also referred to as an Initiator Target (I_T) nexus).

In state 202, the resource manager 130 sends LUN assignments to the partition supervisor 120, and configures the partition supervisor 120. After the configuration, physical resources are assigned to virtual partitions. For example, as in FIG. 1, partition 110 is configured to access LUN 180, and similarly, LUN 181 and LUN 183 are assigned to partition 111, and LUN 182 is assigned to partition 112. The LUN assignments are sent via a system-specific Configuration Notification 101, as shown in FIG. 3.

Figure 3:
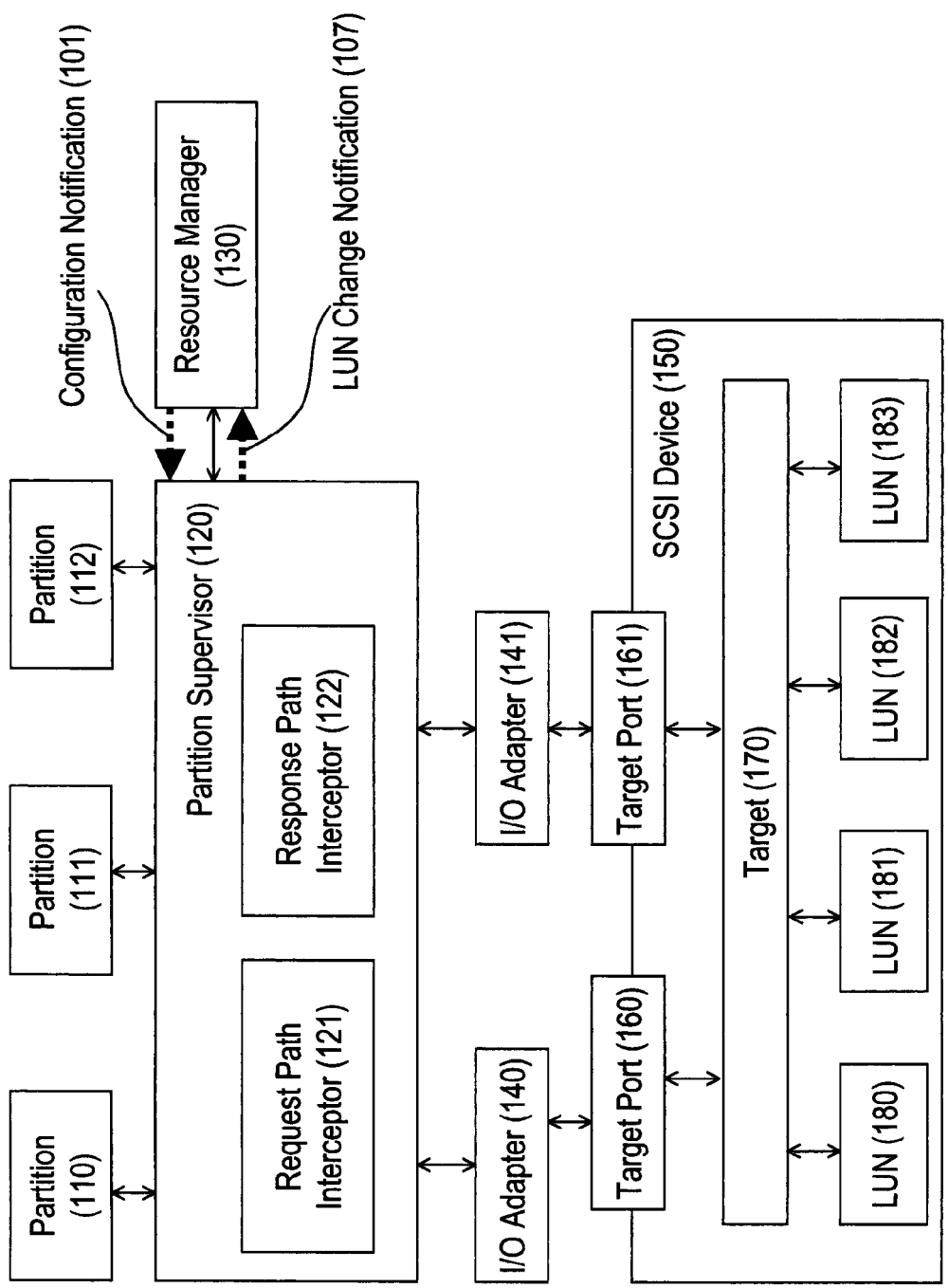
FIG. 3 is a diagram illustrating a request path interceptor and a response path interceptor in a partition supervisor.

In state 203, a request path interceptor 121 is added to the partition supervisor 120, as illustrated in FIG. 3. The request path interceptor 121 modifies any SCSI ULP requests sent by a partition that attempt to query or modify any LUNs that the partition does not own. Similarly in state 204, a response path interceptor 122 is created in the partition supervisor 120. The response path interceptor 122 removes any response data that is associated with any LUNs that a partition does not own. FIG. 3 illustrates both the request path interceptor 121 and the response path interceptor 122.

Figure 4:
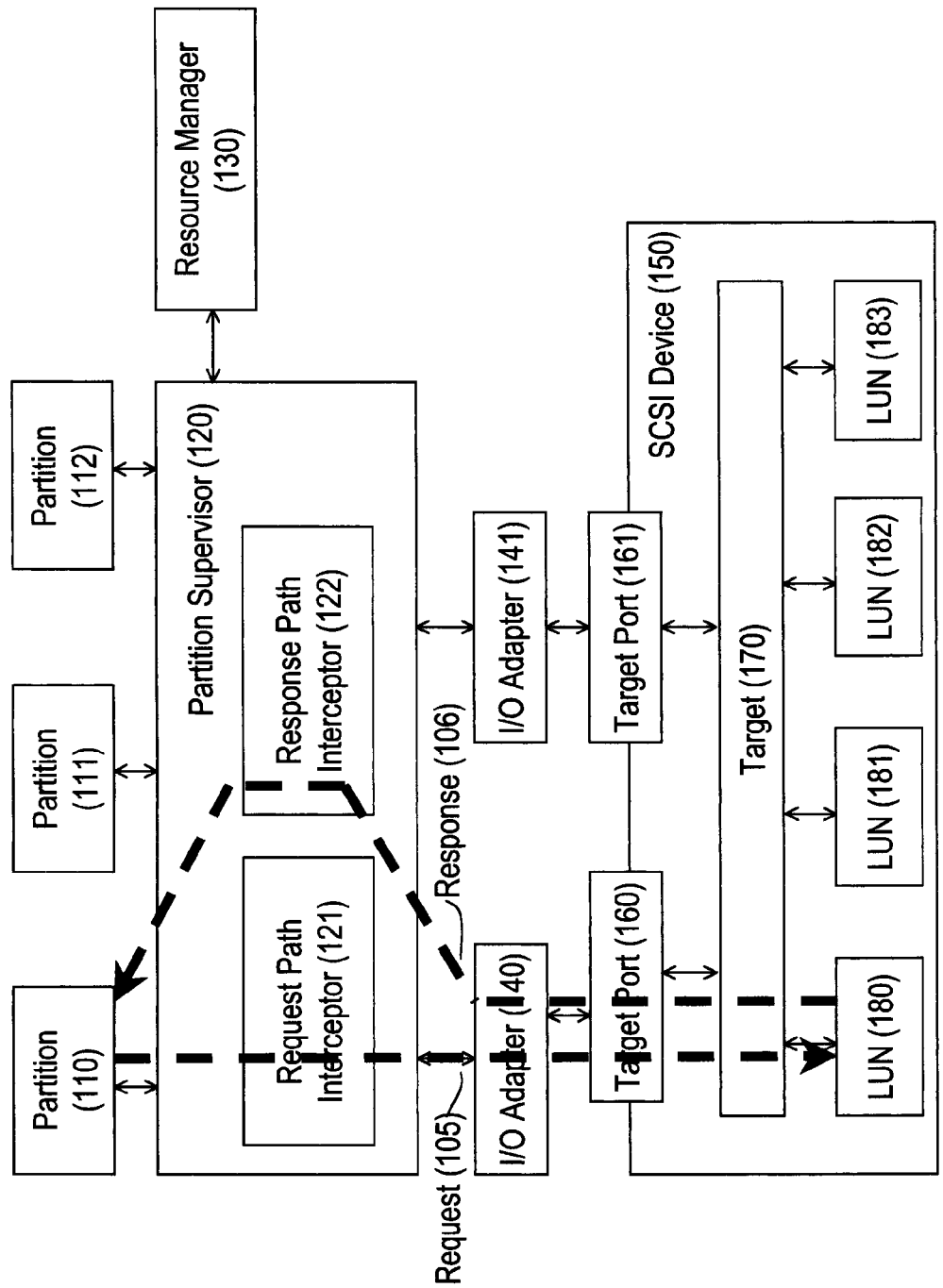
FIG. 4 is a diagram illustrating a request and a response between a partition and a LUN.

FIG. 4 illustrates how the request path interceptor 121 and the response path interceptor 122 are used to limit the request or response between a partition and a LUN. The request path interceptor 121 modifies an SCSI ULP request 105 sent by partition 110 that attempts to query or modify any LUNs that partition 110 does not own. Similarly, the response path interceptor 122 removes any response 106 that is associated with any LUNs that partition 110 does not own (i.e. 181, 182 and 183).

A response 106 that indicates a possible change to the LUNs attached to the system causes the response path interceptor 122 to send a LUN Change Notification 107 (as illustrated in FIG. 3) to the resource manager 130. For example, when a new LUN is added to the system, the resource manager 130 is notified by a LUN change notification 107. In one embodiment of the present invention, any time the contents of LUN list from a Report LUNs command change, the target 170 creates a pending Unit Attention condition to flag that "Reported LUNs Data Has Changed". This Unit Attention condition will be reported on the next command issued on any LUN attached to the target. This Unit Attention condition will be intercepted by the Response Path Interceptor 122 which will send LUN change notification 107 to the resource manager 130.

Only a small subset of SCSI ULP requests need to be intercepted. For example, a report LUNs request that reports all LUNs attached to a target should be intercepted, because a partition must not see LUNs it does not own. Other requests that may affect more than one LUN should be intercepted, for example, a Mode Select request, a Send Diagnostic request, or a Write Buffer request. These intercepted requests are usually not performance sensitive. A read or write request will not be intercepted. They will be passed directly to the LUN that they intent to access, so there is no penalty for the performance-sensitive read and write requests.

Figure 5:
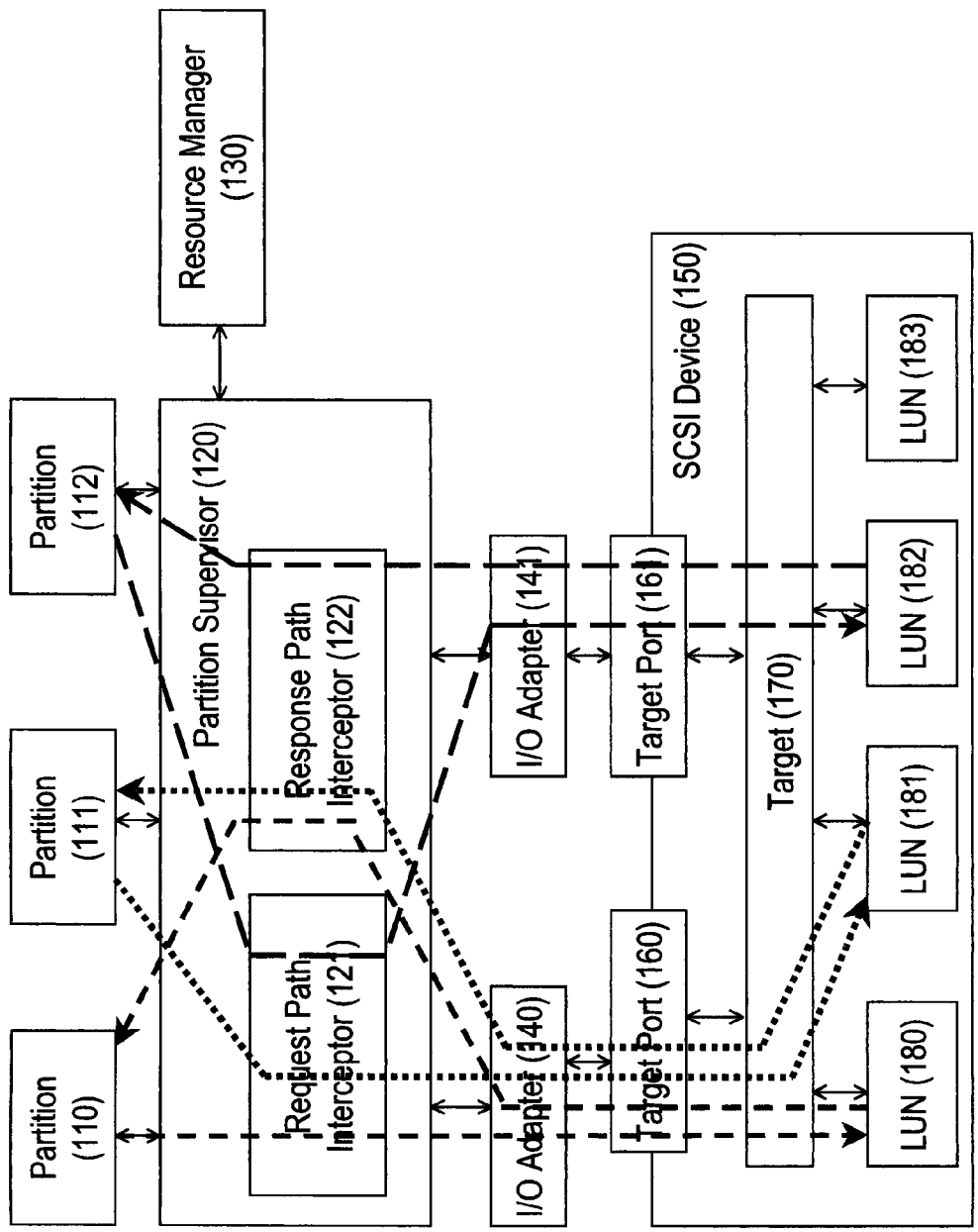
FIG. 5 is a diagram showing how the partitions share physical resources.

In the present invention, partitions share resources that otherwise have to be dedicated. The resources include both software resources such as operating system and device drivers, and hardware resources such as adapter cards, storage devices and physical interfaces. As an example, FIG. 5 illustrates how different partitions share the resources. In FIG. 5, three different dashed lines represent the request/response of three different partitions (partitions 110, 111 and 112). As shown in FIG. 5, partition 110 and partition 111 share an I/O adapter 140, partition 110 and partition 111 share a target port 160, and partition 110, partition 111 and partition 112 share a target 170. This invention does not limit sharing of other components as would be obvious to someone skilled in the art.

This invention is not limited to a single hardware transport. It works equally well for major industry standard transports such as Parallel SCSI, Serial Attached SCSI (SAS), Fibre Channel (FC), Peripheral Component Interface (e.g. PCI, PCI-X, PCI-E).

Figure 6:
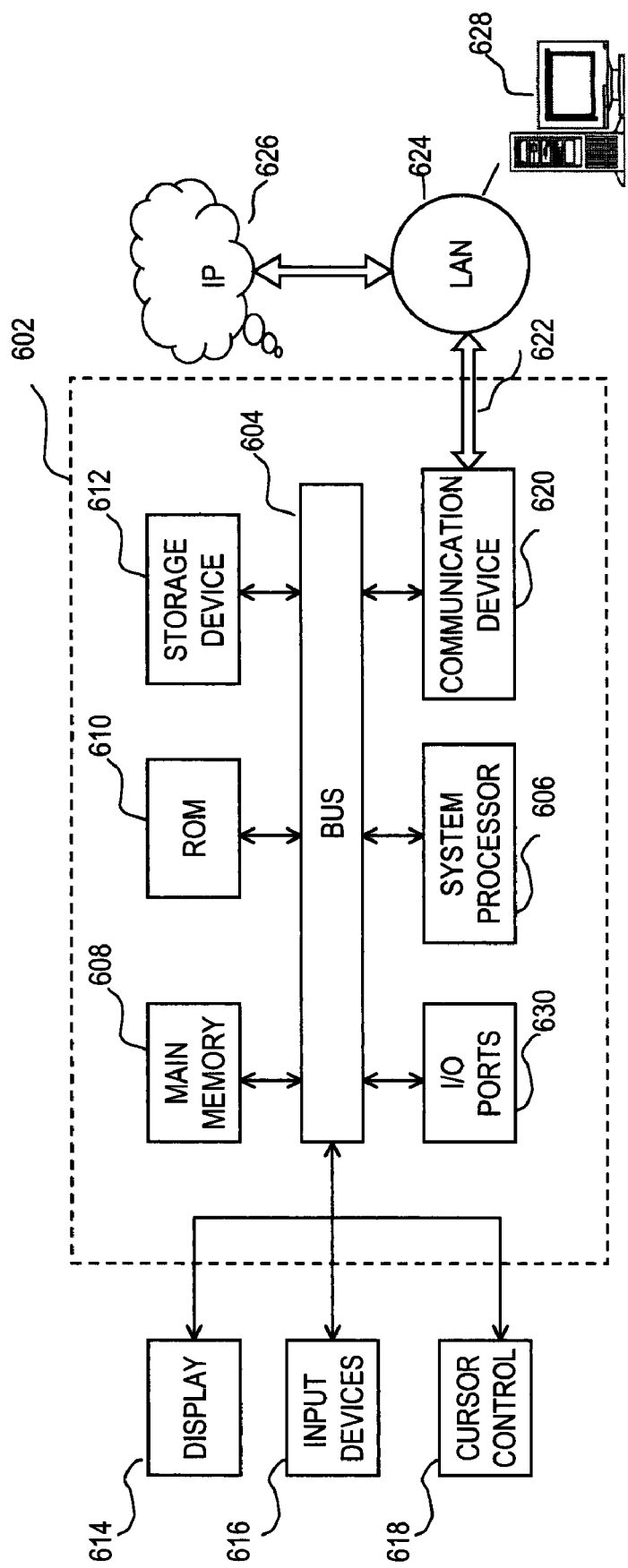
FIG. 6 is a conceptual diagram of a computer system in which the present invention can be implemented.

FIG. 6 illustrates a computer system (602) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (604) or other communication mechanism for communicating information and a processor (606) coupled with bus (604) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (606). In addition, main memory (608) may be used for storing temporary variables or other intermediate information during execution of instructions to be executed by processor. The computer system further includes a read only memory (ROM) 610 or other static storage device (e.g., programmable ROM (PROM), erasable PROM (EPROM), and electrically erasable PROM (EEPROM)) coupled to bus 604 for storing static information and instructions for processor. A storage device (612), such as a magnetic disk or optical disk, is provided and coupled to bus for storing information and instructions. This storage device is an example of a computer readable medium.

The computer system also includes input/output ports (630) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1-FIG. 5. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (614), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (616) and a cursor control (618), for communicating information and command selections to processor (606).

Such command selections can be implemented via voice recognition hardware and/or software functioning as the input devices (616). The cursor control (618), for example, is a mouse, a trackball, cursor direction keys, touch screen display, optical character recognition hardware and/or software, etc., for communicating direction information and command selections to processor (606) and for controlling cursor movement on the display (614). In addition, a printer (not shown) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The computer system also includes a communication interface coupled to bus. The communication interface (620) provides a two-way data communication coupling to a network link (622) that may be connected to, for example, a local network (624). For example, the communication interface (620) may be a network interface card to attach to any packet switched local area network (LAN). As another example, the communication interface (620) may be an asymmetrical digital subscriber line (ADSL) card, an integrated services digital network (ISDN) card or a modem to provide a data communication connection to a corresponding type of telephone line. Wireless links may also be implemented via the communication interface (620). In any such implementation, the communication interface (620) sends and receives electrical, electromagnetic or optical signals that carry digital data streams representing various types of information.

Network link (622) typically provides data communication through one or more networks to other data devices. For example, the network link may provide a connection to a computer (626) through local network (624) (e.g., a LAN) or through equipment operated by a service provider, which provides communication services through a communications network (628). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention.

What is claimed is:

1. A method for assigning logic storage entities of a storage device to multiple partitions of a computer system, comprising:
    associating each logic storage entity to at least one of the partitions that is allowed to access the logic storage entity;
    configuring a partition supervisor to control accesses of the partitions to the logic storage entities, so that the partitions can share resources when accessing the logic storage entities; and
    providing an interceptor in the partition supervisor, the interceptor modifying a request, sent by one of the partitions, that attempts to access any of the logic storage entities that the one partition is not allowed to access, and removing response data sent from one of the logic storage entities to any of the partitions that is not allowed to access the one logic storage entity.

2. The method of claim 1, wherein the interceptor further comprises a request interceptor for modifying the request that attempts to access any of the logic storage entities that the one partition is not allowed to access.

3. The method of claim 1, wherein the interceptor further comprises a response interceptor for removing the response data to any of the partitions that is not allowed to access the one logic storage entity.

4. The method of claim 1, wherein the logic storage entity comprises a logic unit with a logic unit number (LUN).

5. The method of claim 1, wherein the resources comprise both software resources and hardware resources.

6. The method of claim 1, further comprising providing a resource manager to manage the logic storage entities and configure the partition supervisor.

7. The method of claim 1, wherein only a SCSI ULP (Small Computer System Interface Upper Level Protocol) request that may affect more than one logic storage entity is intercepted, and a read request or a write request is not intercepted.

8. A computer program product for assigning logic storage entities of a storage device to multiple partitions of a computer system, the computer program product comprising:
    a non-transitory computer usable medium having computer usable program code embodied therewith, the computer usable program code comprising:
        instructions to associate each logic storage entity to at least one of the partitions that is allowed to access the logic storage entity;
        instructions to configure a partition supervisor to control accesses of the partitions to the logic storage entities, so that the partitions can share resources when accessing the logic storage entities; and
        instructions to provide an interceptor in the partition supervisor, the interceptor modifying a request, sent by one of the partitions, that attempts to access any of the logic storage entities that the one partition is not allowed to access, and removing response data sent from one of the logic storage entities to any of the partitions that is not allowed to access the one logic storage entity.

9. The computer program product of claim 8, wherein the interceptor further comprises a request interceptor for modifying the request that attempts to access any of the logic storage entities that the one partition is not allowed to access.

10. The computer program product of claim 8, wherein the interceptor further comprises a response interceptor for removing the response data to any of the partitions that is not allowed to access the one logic storage entity.

11. The computer program product of claim 8, wherein the logic storage entity comprises a logic unit with a logic unit number (LUN).

12. The computer program product of claim 8, wherein the resources comprise both software resources and hardware resources.

13. The computer program product of claim 8, further comprising instructions to provide a resource manager to manage the logic storage entities and configure the partition supervisor.

14. The computer program product of claim 8, wherein only a SCSI ULP (Small Computer System Interface Upper Level Protocol) request that may affect more than one logic storage entity is intercepted, and a read request or a write request is not intercepted.

15. A computer system comprising:
a processor;
a memory operatively coupled with the processor;
a storage device operatively coupled with the processor and the memory; and
a computer program product for assigning logic storage entities of a storage device to multiple partitions of a computer system, the computer program product comprising:
a non-transitory computer usable medium having computer usable program code embodied therewith, the computer usable program code comprising:
instructions to associate each logic storage entity to at least one of the partitions that is allowed to access the logic storage entity;
instructions to configure a partition supervisor to control accesses of the partitions to the logic storage entities, so that the partitions can share resources when accessing the logic storage entities; and
instructions to provide an interceptor in the partition supervisor, the interceptor modifying a request, sent by one of the partitions, that attempts to access any of the logic storage entities that the one partition is not allowed to access, and removing response data sent from one of the logic storage entities to any of the partitions that is not allowed to access the one logic storage entity.

16. The computer system of claim 15, wherein the interceptor further comprises a request interceptor for modifying the request that attempts to access any of the logic storage entities that the one partition is not allowed to access.

17. The computer system of claim 15, wherein the interceptor further comprises a response interceptor for removing the response data to any of the partitions that is not allowed to access the one logic storage entity.

18. The computer system of claim 15, wherein the logic storage entity comprises a logic unit with a logic unit number (LUN).

19. The computer system of claim 15, wherein the resources comprise both software resources and hardware resources.

20. The computer system of claim 15, further comprising instructions to provide a resource manager to manage the logic storage entities and configure the partition supervisor.

21. The computer system of claim 15, wherein only a SCSI ULP (Small Computer System Interface Upper Level Protocol) request that may affect more than one logic storage entity is intercepted, and a read request or a write request is not intercepted.

* * * * *